Sept. 2, 1952 H. B. CRAWFORD 2,609,231
HOSE CARRIER
Filed March 8, 1948
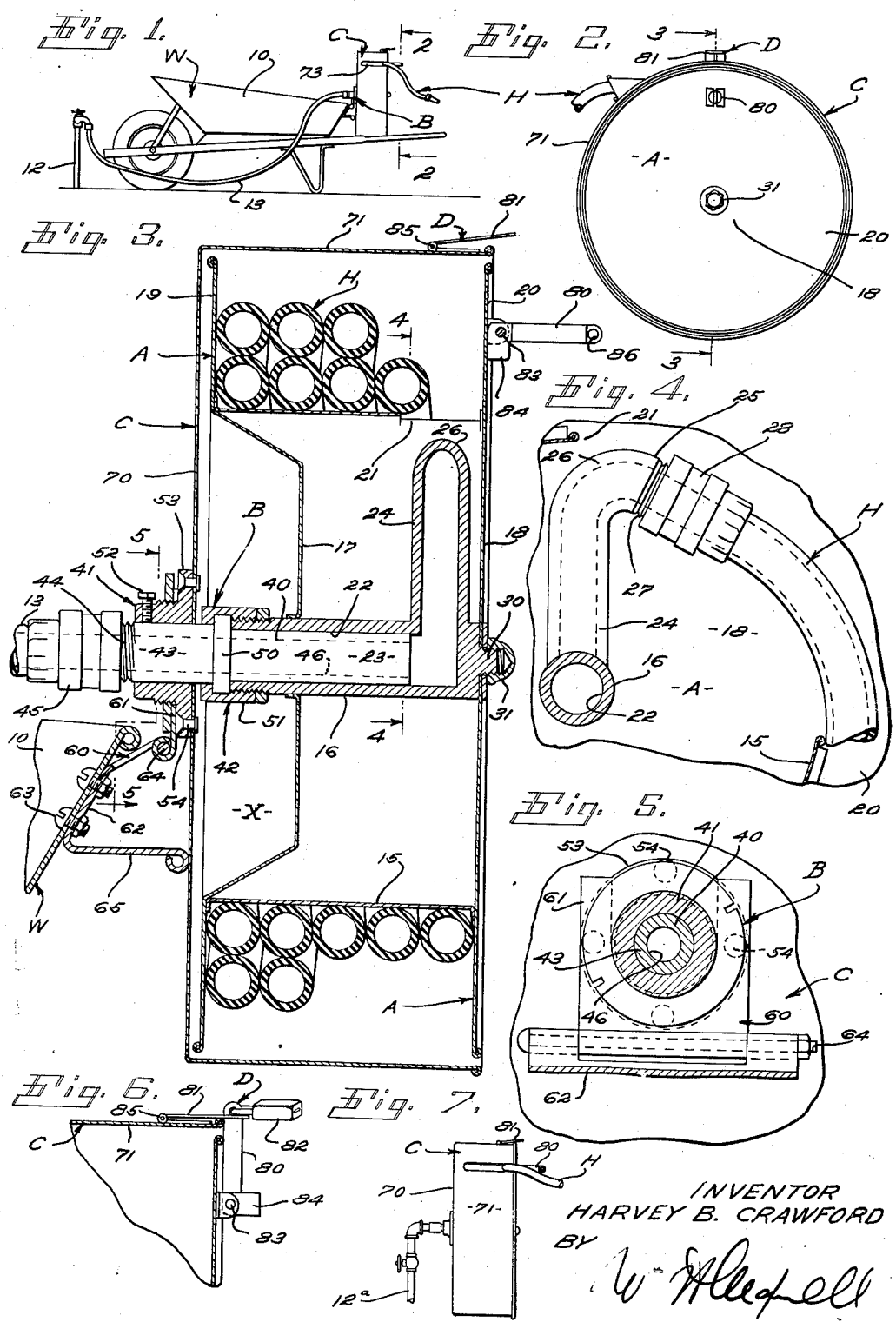
INVENTOR
HARVEY B. CRAWFORD
BY
ATTORNEY

Patented Sept. 2, 1952

2,609,231

UNITED STATES PATENT OFFICE 2,609,231

HOSE CARRIER

Harvey B. Crawford, La Canada, Calif.

Application March 8, 1948, Serial No. 13,555

6 Claims. (Cl. 299—53)

This invention has to do with a hose carrier and it is more specifically concerned with a device that handles hose in the form of a reel or coil and which is portable, simple and inexpensive of manufacture and convenient and practical to handle.

The structure of the present invention is intended primarily to handle lengths of hose such as garden hose, or the like, and it is a general object of the invention to provide a structure practical for use around a home or at locations where lengths of hose are used in a manner such as they are about a home.

A general object of the present invention is to provide a hose carrier of the general character referred to which is of simple, inexpensive manufacture. The structure of the present invention involves few simple inexpensive parts which are easy to assemble.

It is another object of the present invention to provide a carrier of the general character referred to applicable to a supply pipe to be supported thereby or applicable to a mounting or carrier such as a wheeled vehicle. In many situations the carrier may be combined with or mounted on a wheelbarrow, or the like, so that it can be readily transported from place to place and yet does not unduly complicate or interfere with operation of the wheelbarrow, as such.

Another object of the invention is to provide various features in the way of the arrangement, formation and relationship of parts in a structure of the general character referred to, to the end that the structure is simple, compact and practical to handle.

The various objects and features of my invention will be fully understood from the following detailed description of a typical preferred form and application of the invention, throughout which description reference is made to the accompanying drawings, in which:

Fig. 1 is a side elevation of a structure embodying the present invention, showing it mounted on or carried by a typical wheel-barrow. Fig. 2 is an end view of the structure, being a view taken as indicated by line 2—2 on Fig. 1. Fig. 3 is an enlarged, longitudinal sectional view of the structure being a view taken as indicated by line 3—3 on Fig. 2. Fig. 4 is a detailed sectional view taken as indicated by line 4—4 on Fig. 3. Fig. 5 is a detailed sectional view taken as indicated by line 5—5 on Fig. 3. Fig. 6 is a detailed sectional view illustrating the lock provided by the present invention and Fig. 7 is a side elevation of a device embodying the present invention showing it mounted directly on a supply pipe.

The carrier provided by the present invention is particularly practical as a means of handling a length of hose such as is used about a household or garden, and it is such that it may be mounted in various manners. In the drawings in Fig. 1 I have shown it mounted on a wheeled vehicle, whereas in Fig. 7 I have shown it mounted directly on a water supply pipe. In Fig. 1 the hose carrier of the present invention is shown mounted on the rear edge of the body 10 of a wheelbarrow W and is shown coupled with a supply pipe 12 by means of a short connecting hose 13. In Fig. 7 of the drawings the structure embodying the present invention is shown mounted directly on a supply pipe 12$^a$ and when thus mounted it is unnecessary to employ a hose such as is shown in Fig. 1 of the drawings.

The structure embodying the present invention involves, generally, a reel A carrying the hose H, a mounting B supporting the reel A for rotation, a casing or housing C for the reel and lock means D rendering the hose secure in the housing.

The reel A in its preferred form includes, generally, a drum 15, cylindrical in form and on which the hose H is wound or coiled, a central hub 16 supported by the mounting means B, drum supporting flanges 17 and 18 projecting from the hub 16 and supporting the drum concentric with the hub, and hose retaining flanges 19 and 20 projecting radially from the ends of the drum and preventing displacement of the hose therefrom.

The drum 15 may, in practice, be of any suitable size, that is, of any desired length or diameter, and it is preferably a simple or plain cylindrical drum except that it is provided at one point, preferably adjacent the outer flanges 18 and 20, with an opening or aperture 21.

The hub 16 has a central bore 22 entering it from its inner end forming a round socket receiving the spindle portion 23 of the mounting means B. A tubular arm 24 projects radially from the outer end of the hub 16 and is in communication with the bore 22 in the hub. A hose receiving head 25 is supported by the arm 24 at or in the opening 21 of the drum through a neck 26, so that the head faces circumferentially of the drum. The head 25 is preferably provided with threads 27 for receiving a typical or standard hose connection 28. The inner or receiving end of the hose H is coupled to the head 25 through the connection 28 and since the head 25 faces circumferentially the hose is led from the head onto the exterior of the drum 15 without severe bending or kinking.

The drum supporting flange 17 is at the inner end of the reel and has an inner portion projecting radially from the inner end portion of the hub 16 and an outer portion that is inclined or conically formed and extends to and supports the inner end of the drum 15. The flange 17 thus establishes a chamber X in the structure accommodating a part of the means B, as will be apparent from an examination of Fig. 3 of the drawings.

The drum supporting flange 18 is located at the outer end of the structure and is a flat or plain flange fixed to the end of the hub 16 and projecting radially therefrom to the outer end of the drum 15. In the case illustrated the hub 16 is shown with a projection 30 that extends through the center of the flange 18 and a nut 31 is carried on the lug 30 and connects the flange 18 to the hub.

The hose retaining flanges 19 and 20 are preferably flat or plain flanges projecting radially from the ends of the drum 15. In the case illustrated the flange 20 is an integral continuation of the flange 18, the flanges 18 and 20 being formed of one continuous sheet or plate of material.

The mounting means B involves, generally, a tubular support 40, a collar 41 on the support and carrying the housing C, and a coupling 42 between the center and the hub 16 of the reel.

In its preferred form the center 40 has an inner or cylindrical portion 23 on which the hub 16 is mounted. The spindle portion 23 is preferably round and of such size as to fit the bore 22 of the hub 16 with only working clearance that allows the hub to freely rotate on the spindle. The rear end portion 43 of the center projects from the rear of the structure and is provided with a thread 44 for the reception of a suitable connection 45, or the like, that may serve to connect a hose with the center or a pipe with the center, as the case may be. The center 40 is a tubular part or has a central opening 46 extending longitudinally through it so that water or other fluid received from a hose 13 or pipe 12ᵃ, as the case may be, is conducted by the center 40 to the hub 16 to flow through the arm 24 to the hose H joined to the head 25.

The coupling 42 provided to couple the hub 16 to the center 40 is shown as involving a flange 50 on the center between the spindle portion 23 and the end portion 43 and a sleeve 51 threaded on the inner end of the hub 16 and engaged over the flange 50, as clearly shown in Fig. 3 of the drawings. This construction joins the hub and the center so that the hub does not shift axially on the center while at the same time it allows free rotation of the hub on the center.

The collar 41 of the mounting means is slidably engaged on the portion 43 of the center and carries a set screw 52 by which it is set on the center in any desired rotative position. The collar has a radially projecting flange 53 to which the housing C is joined or fixed, as by rivets 54, or other suitable means.

When the structure is to be carried or mounted in the manner shown in Fig. 7, the mounting means B needs to involve only the parts thus far described. If it is desired to mount the structure in the manner shown in Fig. 1 then the mounting means includes a bracket 60 coupling the collar 41 with the support, as for instance, the body 10 of the wheelbarrow W.

In the case illustrated the bracket 60 is a hinge bracket having a section 61 mounted on or carried by the collar 41, a section 62 secured to the body of the wheelbarrow by suitable fastening means such as bolts 63, and a hinge pin 64 pivotally connecting sections 61 and 62. In the particular case illustrated the bracket section 62 has a stop lug 65 projecting from it serving as a stop to limit pivotal movement of the housing relative to the part of the wheelbarrow to which the bracket is connected. The stop or lug 65 is preferably such as to stop the housing C in a vertical position, such as is shown throughout the drawings, while allowing it to be swung or tilted forward so that it occupies a horizontal position, if desired.

The housing C is, in effect, a sheet metal case or jacket surrounding the reel A in such manner as to cover the hose wound or carried thereon. In its preferred form the housing involves, generally, an end 70 joined to or carried by the mounting means B to extend radially from the center 40 immediately outside of the inner end flange 19, as shown in the drawings. The housing further involves a body 71 which is cylindrical in form and which projects from the periphery of the end 70 to extend over the reel or to a point adjacent or somewhat beyond the outer end flange 20 of the reel.

In the preferred form of the invention, as illustrated in the drawings the end 70 of the housing is a plain flat plate secured to the flange 53 of collar 40, as by rivets 54, or the like. The body 71 of the housing is preferably a simple cylindrical part and may be integrally joined with the end 70, as shown in the drawings. The housing body 71 is provided with a hose outlet opening 73 preferably in the form of a slot extending axially or lengthwise of the structure to pass hose either into or out of the housing in the course of its being handled by the reel.

In practice the structure above described is such that the housing anchored to or supported by the mounting B through the collar 41 may be rotated to bring the opening 73 in any desired position. To change the opening 73 about the axis of the structure it is merely necessary to rotate the collar 41 on the portion 43 of center 40.

The lock means D is provided to lock the reel against rotation relative to the housing, thus making it impossible to withdraw hose from the structure. In the form of the invention illustrated the lock means D involves generally a projection 80 on the reel, a hasp 81 on the housing engageable with the projection 80, and a lock 82 coupling the projection 80 and hasp 81 so that these parts cannot be separated.

The projection 80 is preferably shaped as a handle and is pivotally mounted on the exterior of flange 20 of the reel A near the periphery thereof through a pivot pin 83. The pivotal mounting of the projection 80 allows it to be swung to a position where it projects from the flange 20 parallel with the axis of the structure and thus forms a handle by which the reel can be conveniently rotated. A stop 84 on the projection 80 serves to stop it in the position where it forms a handle. The projection 80 when folded in or moved to the locking position, as shown in Fig. 6, projects somewhat beyond the periphery of flange 20 to be engaged by the hasp 81.

The hasp 81 is joined to the exterior of the body 71 of the housing by a hinge connection and is provided with an opening that receives the end portion of the projection 80. The end portion of the projection 80 which is passed by the hasp has a lock receiving opening 86. The lock 82 illustrated in the drawings is a simple padlock engaged with the apertured end portion of the projection 80.

With the construction provided by the present invention a hose H may be permanently coupled to the reel A by being joined to the head 25 by means of a coupling 28. The hose is wound on the drum 15 and its outer end portion is passed through the opening 73 in the body 71 of the housing. It will be apparent how the hose can be withdrawn from the structure by merely pulling on the outer end thereof. To retract the hose the reel A is operated through suitable engagement with the handle projection 80. It will be understood that water, or the like, may be handled by the hose at any time, that is, when it is fully extended or is fully retracted or while it is in any intermediate position. When the hose is not required for use it is preferably wound onto the housing leaving only the tip or nozzle end projecting and when in this position the hasp 81 is engaged with the handle projection 80 and the lock 82 is applied. When the reel is locked to the housing by the lock means D it cannot be rotated and consequently the hose cannot be withdrawn.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A hose carrier including, a reel, a housing, and a mounting rotatably supporting the reel within the housing and carrying the housing in a fixed position, the housing including, a cylindrical shell and a flat inner end wall closing the inner end of the shell, the reel including, a drum within the shell and on which the hose is wound, flanges retaining the hose on the drum at the ends thereof, the flange at the outer end of the drum being a flat disc-shaped plate completely closing the outer end of the drum and forming a closure for the outer end of the housing shell, the flange at the inner end of the drum being concave inward of the drum, and a centrally located flow conducting hub receiving flow at one end and having its other end fixed to the first mentioned flange with an arm extending to the drum and receiving the hose at the drum, and the mounting including a single tubular center receiving fluid at its outer end and having a spindle portion rotatably supporting the hub and supplying fluid to the hub for flow to the hose through the arm, there being a hub retaining part on the spindle within the cavity formed by the flange at the inner end of the drum.

2. A hose carrier including, a reel, a housing, and a single mounting carrying the reel and the housing, the reel including, a drum on which the hose is wound, flanges retaining the hose on the drum, and a flow conducting hub fixed to the flanges and having an arm extending to the drum and receiving the hose, and the mounting including a single tubular center with a hub supporting spindle at its inner end and a flow connection at its outer end, a collar fixed on the center carrying the housing, and a bracket carried by and projecting from the collar and engageable with a support.

3. A hose carrier including, a reel, a housing, and a mounting carrying the reel and the housing, the reel including, a drum on which the hose is wound, flanges retaining the hose on the drum, and a flow conducting hub with an arm extending to the drum and receiving the hose, and the mounting including a tubular center with a hub supporting spindle at its inner end and a flow connection at its outer end, a collar on the center between its ends and carrying the housing, and a bracket hinged to the collar and engageable with a support.

4. A hose carrier including, a reel, a housing including a shell surrounding the reel and an end wall closing one end of the shell, a single mounting carrying the reel and the housing, and means coupling the reel and mounting against relative movement axially of the reel, the reel including, a drum on which the hose is wound, flanges retaining the hose on the drum, one of the flanges being at the outer end of the reel and closing the other end of the housing shell, and a flow conducting hub with an arm extending to the drum and receiving the hose, and the mounting including, a tubular center receiving fluid at its outer end and having a spindle portion rotatably supporting the hub and supplying fluid to the hub for flow to the hose through the arm, said means including a fixed flange on the spindle of the center and a sleeve threaded on the hub engaged with the flange.

5. A hose carrier including, a reel, a housing, a mounting carrying the reel and the housing, and lock means between the reel and housing, the reel including, a drum on which the hose is wound, flanges at the ends of the drum retaining the hose on the drum, and a flow conducting hub with an arm extending to the drum and receiving the hose, and the mounting including a tubular center receiving fluid at its outer end and having a spindle portion rotatably supporting the hub and supplying fluid to the hub for flow to the hose through the arm, the housing including an inner end flange carried by the mounting and a cylindrical shell supported by said inner end flange and extending over one flange of the reel to the other flange of the reel and having an opening passing the hose, the lock means including a handle on the last mentioned flange of the reel, a member on the shell of the housing engageable with the handle and a lock connecting the handle and said member.

6. A hose carrier including, a reel, a housing, and a mounting carrying the reel and the housing, the reel including, a drum on which a hose is adapted to be wound, flanges at the ends of the drum retaining the hose on the drum, and a flow conducting hub within the drum and having an arm extending to the drum and adapted to receive the hose, and the mounting including a stationary tubular center having an outer end portion supporting the housing adjacent one end of the reel and adapted to receive fluid, the said center having a spindle portion within the housing and extending into the hub and rotatably supporting the hub and adapted to supply fluid to the hub for flow therefrom to the arm, the housing including an end flange engaged with and carried by the said outer end portion of the center and a cylindrical body having one end joined to and supported by the peripheral portion of the end flange, said body extending over and around the reel and having an opening adapted to pass the hose, the flange of the reel at the outer end of the drum forming a closure for the other end of the housing body.

HARVEY B. CRAWFORD.

REFERENCES CITED

The following references are of record in the file of this patent:

UNITED STATES PATENTS

| Number | Name | Date |
| --- | --- | --- |
| 979,382 | Coonradt | Dec. 20, 1910 |
| 1,011,397 | Anderson | Dec. 12, 1911 |
| 1,156,402 | Heim | Oct. 12, 1915 |
| 1,339,785 | Perrine | May 11, 1920 |
| 2,063,843 | Jensen | Dec. 8, 1936 |
| 2,096,225 | Crawford | Oct. 19, 1937 |
| 2,403,277 | Hall | July 2, 1946 |